(12) United States Patent
D'Amicantonio et al.

(10) Patent No.: US 8,100,793 B2
(45) Date of Patent: Jan. 24, 2012

(54) VEHICLE BELT DRIVE TORSION BAR TENSIONER WITH AN IMPROVED DAMPING DEVICE

(75) Inventors: Luca D'Amicantonio, Pescara (IT); Heinz Lemberger, Unterföhring (DE)

(73) Assignees: Dayco Europe S.R.L. Con Unico Socio, Chieti (IT); Bayerische Motoren Werke Aktiengesellschaft, Munchen (DE)

( * ) Notice: Subject to any disclaimer, the term of this patent is extended or adjusted under 35 U.S.C. 154(b) by 405 days.

(21) Appl. No.: 11/596,611

(22) PCT Filed: May 12, 2005

(86) PCT No.: PCT/EP2005/052167
§ 371 (c)(1),
(2), (4) Date: Aug. 22, 2007

(87) PCT Pub. No.: WO2005/114003
PCT Pub. Date: Dec. 1, 2005

(65) Prior Publication Data
US 2008/0293527 A1    Nov. 27, 2008

(30) Foreign Application Priority Data
May 14, 2004 (EP) .................................. 04425348

(51) Int. Cl.
*F16H 7/12* (2006.01)
(52) U.S. Cl. ........................................ 474/135; 474/138
(58) Field of Classification Search .................. 474/117, 474/133–135
See application file for complete search history.

(56) References Cited

U.S. PATENT DOCUMENTS
4,472,162 A * 9/1984 Hitchcock ..................... 474/135
(Continued)

FOREIGN PATENT DOCUMENTS
DE    3905219 A1 *  4/1990
DE    39 12 944 A1    9/1990
DE    4124637 A1 *  1/1993
(Continued)

OTHER PUBLICATIONS

PCT International Search Report for PCT Counterpart Application No. PCT/EP2005/052167 containing Communication relating to the Results of the Partial International Search Report, 2 pgs., (Jul. 6, 2005).

*Primary Examiner* — Robert Siconolfi
*Assistant Examiner* — Stephen Bowes
(74) *Attorney, Agent, or Firm* — Blakely, Sokoloff, Taylor & Zafman LLP.

(57) ABSTRACT

A tensioner (1; 50; 60) for a vehicle belt drive, having a housing (2) defining a cavity (3) having an axis (A); at least one arm (4) fitted to the housing (2) to rotate about the axis (A); an idle pulley (5) fitted to the arm (4); a torsion bar elastic member (6) housed at least partly in the cavity (3) and having a first end portion (15) integral with the arm (4), and a second hand portion (16) connected rigidly to a retaining portion (17) to permit tensioning of the elastic member (6); and a damping device (30) for damping oscillation of the arm (4), and having a conical friction member (32) cooperating axially with a mating surface (34) and loaded by axial elastic means (33). The friction member (32) is interposed between the arm (4) and the housing (2); and the elastic member (6) produces an axial thrust component depending on torsion of the elastic member and for pressing the friction member (32) and the mating surface.

19 Claims, 4 Drawing Sheets

U.S. PATENT DOCUMENTS

| | | | | |
|---|---|---|---|---|
| 4,473,362 A | * | 9/1984 | Thomey et al. | 474/135 |
| 5,011,460 A | * | 4/1991 | Ouchi et al. | 474/133 |
| 5,795,257 A | * | 8/1998 | Giese et al. | 474/109 |
| 2003/0022746 A1 | * | 1/2003 | Ayukawa | 474/135 |
| 2004/0171448 A1 | * | 9/2004 | Lemberger et al. | 474/135 |

FOREIGN PATENT DOCUMENTS

| | | |
|---|---|---|
| DE | 44 28 560 A1 | 2/1996 |
| DE | 44 31 801 A1 | 3/1996 |
| GB | 2 377 981 A | 1/2003 |

* cited by examiner

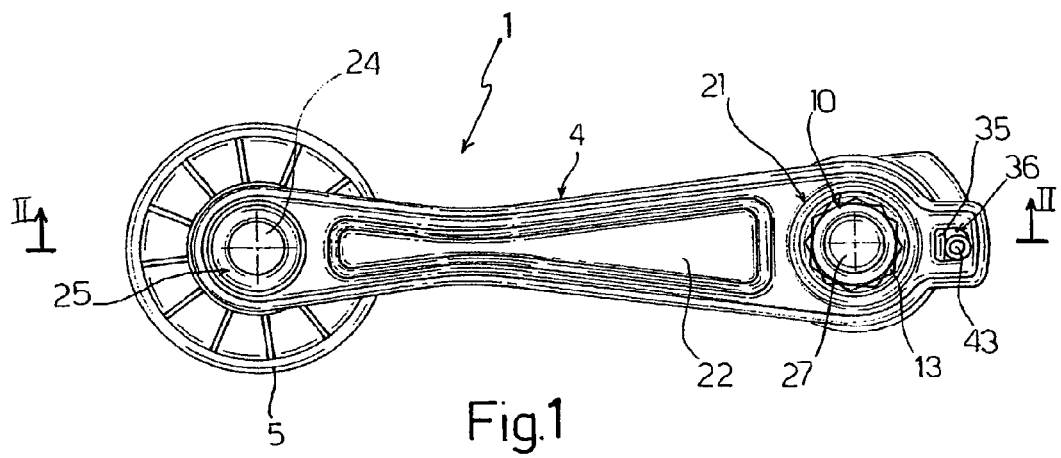
Fig.1
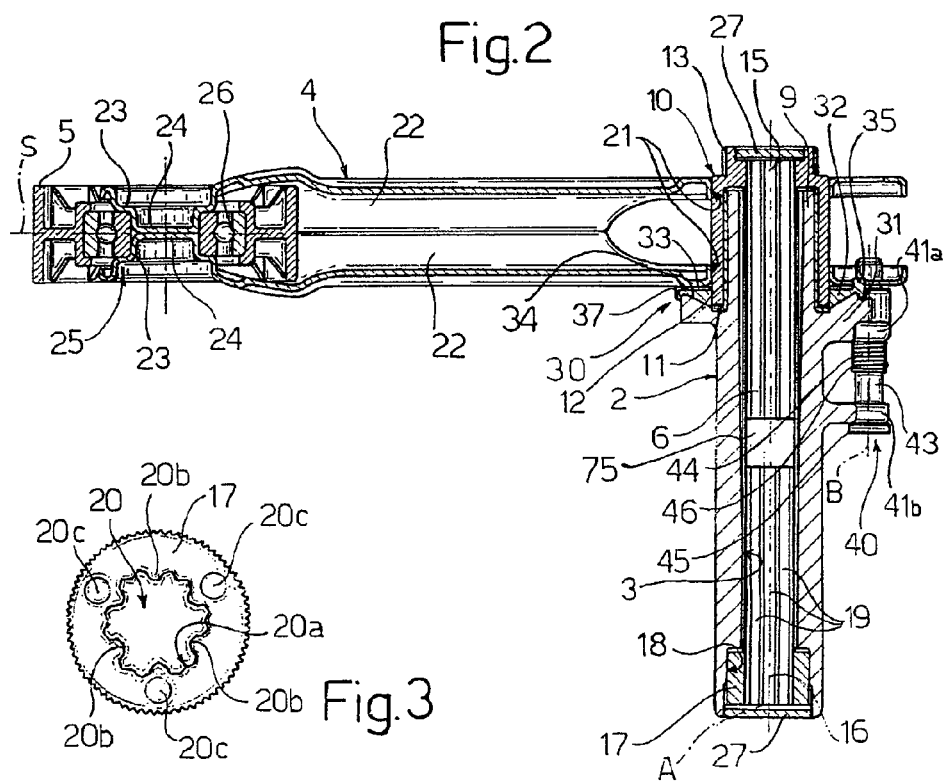
Fig.2
Fig.3

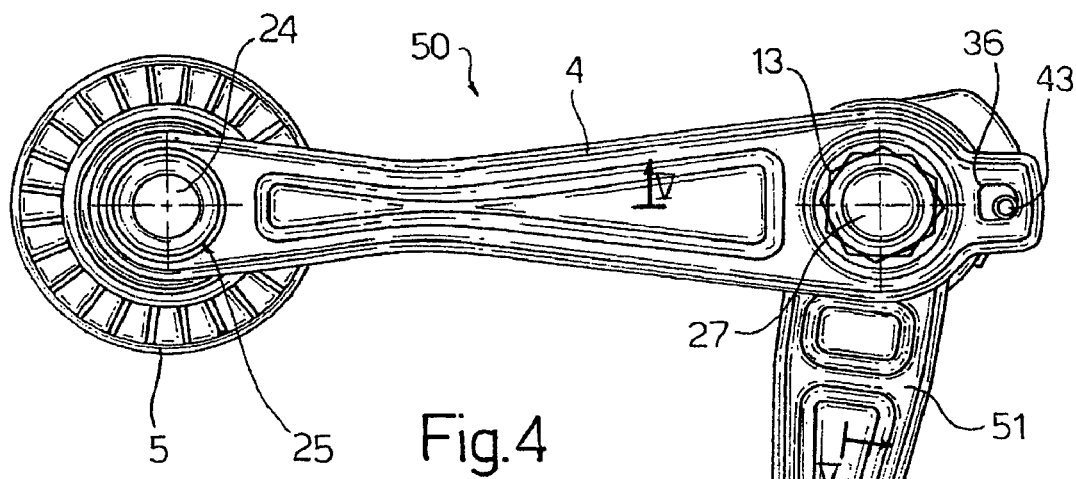
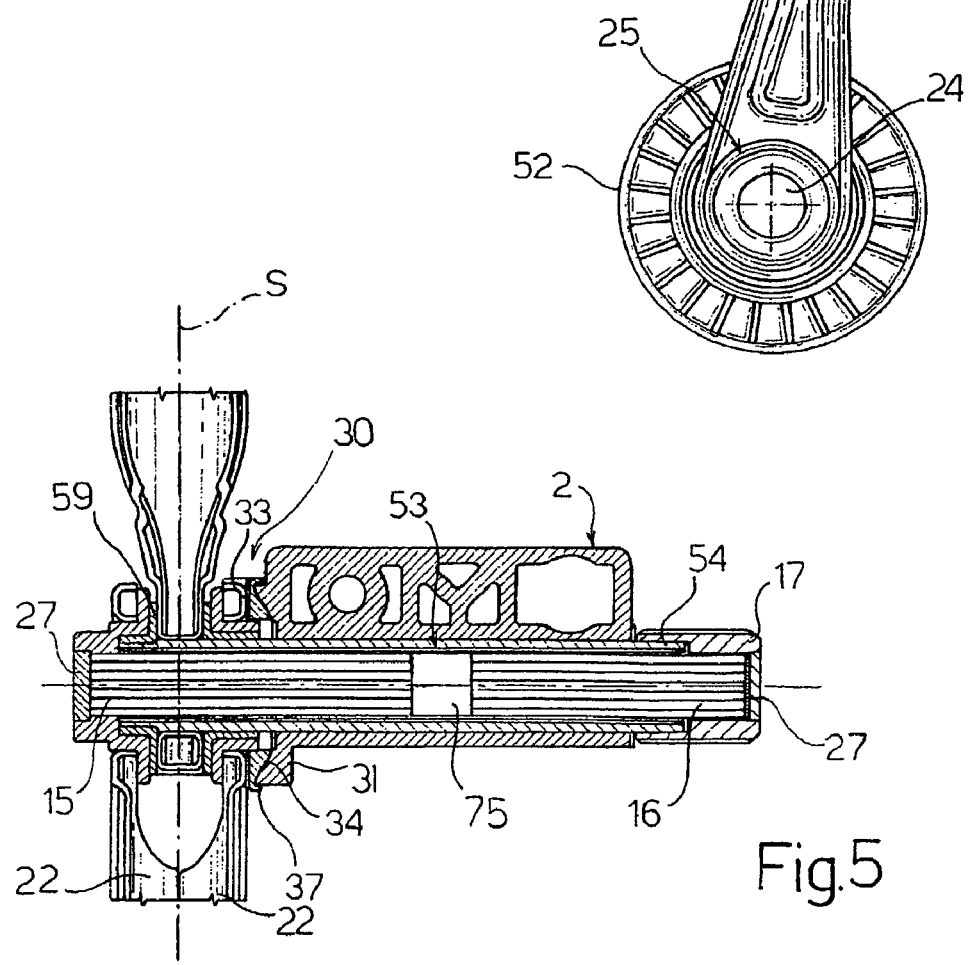

VEHICLE BELT DRIVE TORSION BAR TENSIONER WITH AN IMPROVED DAMPING DEVICE

TECHNICAL FIELD

The present invention relates to a vehicle belt drive torsion bar tensioner with an improved damping device.

BACKGROUND ART

Vehicle internal combustion engine belt drives normally feature a tensioner for ensuring correct tension of the drive belt. In the case of complex drives, and when space is limited, elongated torsion bar tensioners are preferred to conventional types, by being more compact transversely, and therefore housable alongside the engine or an engine accessory.

Patent DE A 3 912 944 describes a torsion bar tensioner comprising an elongated protective tube; an arm rotating about a longitudinal axis of the protective tube and supporting an idle pulley at the end; a torsion bar defined by a group of three elastic beam elements, which exert elastic thrust on the arm to ensure correct tension of the drive belt; and a damping device for damping angular oscillation of the arm.

More specifically, the elastic elements have a hexagonal cross section, and the protective tube housing the elastic elements is connected rigidly to the arm at a first end, and cooperates with the damping device at a second end opposite the first.

The damping device comprises a truncated-cone-shaped housing integral with a fixed wall of the engine; a friction member connected prismatically to the protective tube and cooperating frictionally with an inner work surface of the truncated-cone-shaped housing; and a Belleville washer for pressing the friction member against the work surface.

In actual use, the protective tube is housed to rotate freely inside a supporting bush, the arm tightens the belt by means of the pulley, and oscillation of the arm transmitted to the protective tube is damped by the damping device.

The damping device described above has the drawback of being connected to a wall of the engine, and of comprising a large number of component parts, thus complicating assembly and increasing the length of the device.

Moreover, the Belleville washer, being interposed between the fixed wall and the friction member integral with the arm, is subject to wear, and must therefore be sized to ensure an adequate axial load even when the friction member is worn.

DISCLOSURE OF INVENTION

It is an object of the present invention to provide a belt drive torsion bar tensioner designed to eliminate the aforementioned drawbacks.

According to the present invention, there is provided a belt drive torsion bar tensioner as claimed in Claim 1.

BRIEF DESCRIPTION OF THE DRAWINGS

Three preferred, non-limiting embodiments of the present invention will be described by way of example with reference to the accompanying drawings, in which:

FIG. 1 shows a front view of a tensioner in accordance with the present invention;

FIG. 2 shows a section of the tensioner along line II-II in FIG. 1;

FIG. 3 shows a larger-scale view of a detail of the FIG. 1 tensioner;

FIG. 4 shows a front view of a further embodiment of the present invention;

FIG. 5 shows a partial section along line V-V in FIG. 4;

BEST MODE FOR CARRYING OUT THE INVENTION

Figure 6:
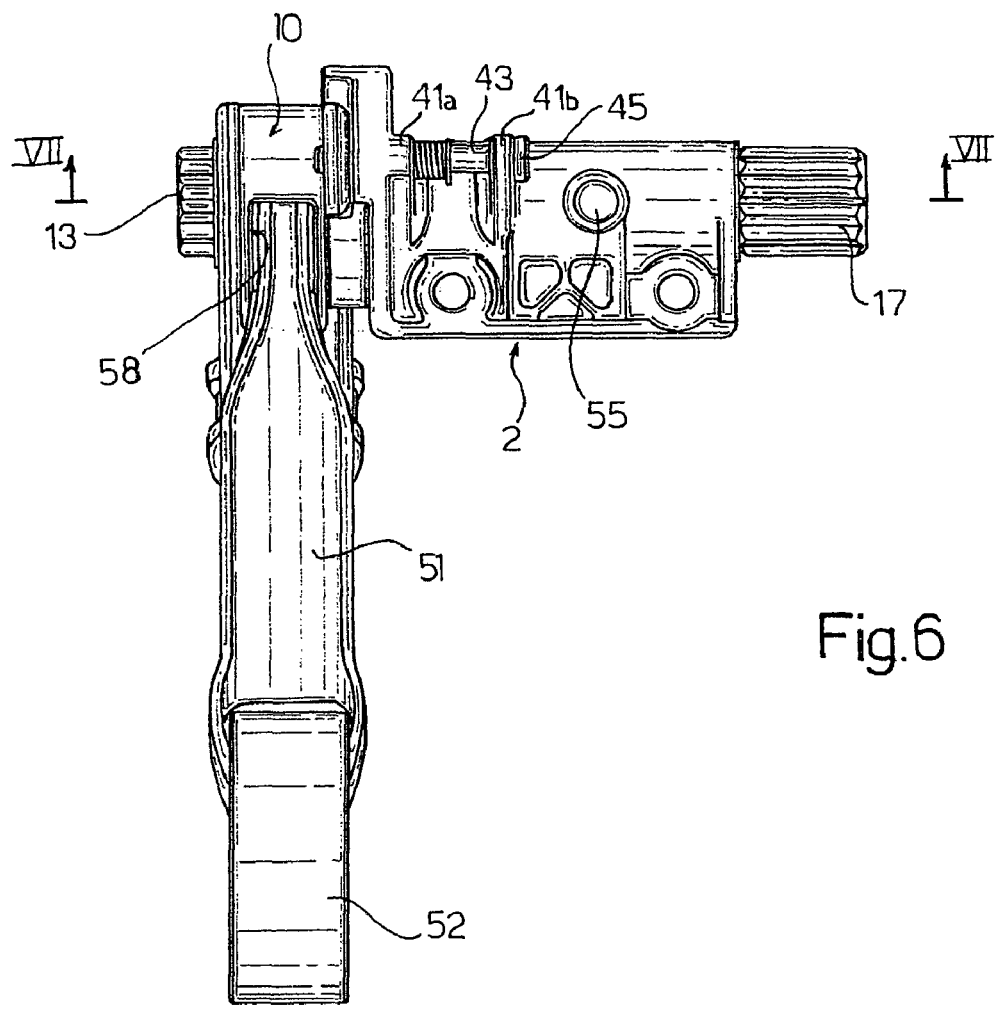
FIG. 6 shows a side view of the FIG. 4 tensioner.

Number 1 in FIG. 1 indicates as a whole a torsion bar tensioner for tensioning a belt of an internal combustion engine belt drive.

Tensioner 1 comprises an elongated housing 2 having a longitudinal through cavity 3 of axis A; an arm 4 connected in rotary manner to housing 2 and supporting an idle end pulley 5 cooperating with the belt; and a torsion bar 6 for elastically loading arm 4.

More specifically, housing 2 comprises, integrally at one end, a cylindrical hub 9 coaxial with axis A; and arm 4 comprises, integrally, a cylindrical cap 10 located at the opposite end to pulley 5, and in turn comprising a lateral wall 11 fitted in rotary manner to hub 9 with the interposition of a bush 12 of antifriction material, and a shaped head 13 engageable by a tool.

Torsion bar 6, housed inside cavity 3, comprises, integrally, a first end portion 15 connected rigidly to cap 10; and a second end portion 16 connected rigidly to a cylindrical bush 17 integral with housing 2.

More specifically, torsion bar 6 comprises a bundle of beam elements 19, which are hexagonal in cross section, are arranged in a configuration of maximum compactness, and the opposite ends of which engage respective shaped through cavities 20 in bush 17 and head 13 of cap 10.

FIG. 3 shows bush 17 and relative shaped cavity 20, which has a cross section 20a symmetrical with respect to axis A and hexagonally modular, i.e. defined by combining a number of single sections or modules in the form of regular hexagons. Shaped cavity 20 is bounded laterally by a surface having a succession of radial portions 20b symmetrical with respect to a radial line through axis A, and projecting inwards of cross section 20a.

Bush 17 also comprises three dead axial holes 20c equally spaced about shaped cavity 20 and for engagement by a torque wrench.

By means of shaped cavities 20, cap 10 and bush 17 are connected rigidly, by both shape and interference, to the ends of beam elements 19 to impose the shape of the cross section of torsion bar 6.

More specifically, bush 17 is driven inside a seat 18 in housing 2, opposite hub 9 and coaxial with cavity 3; cap 10 is driven inside a seat 21 formed on arm 4, at the opposite end to pulley 5; and respective cover disks 27 are fitted to the outside of shaped cavities 20 to protect end portions 15, 16 from external agents.

Arm 4 comprises two identical pressed sheet metal shells 22 connected rigidly along a plane of symmetry S (FIG. 2) crosswise to axis A to form a closed rectangular box section.

Shells 22 partly house and support pulley 5, and, for this purpose, comprise, integrally, respective stamped cylindrical projections 23 having axes parallel to axis A, and respective end walls 24 joined at plane S to form a pin 25 supporting a bearing 26 of pulley 5.

Tensioner 1 also comprises a damping device 30, in turn comprising a fixed annular mating wall 31 projecting from housing 2 beneath hub 9; a friction member 32 angularly integral with arm 4 and gripped axially against mating wall 31; and an annular undulated spring 33 interposed between arm 4 and friction member 32 to exert an axial load on friction member 32 and take up any slack caused by wear.

More specifically, mating wall 31 has a conical surface 34 facing cap 10 and mating with friction member 32, which is also annular and fitted to cap 10.

Friction member 32 comprises, integrally, an axial projection 35, which engages a slot 36 (FIG. 1) on arm 4 to connect friction member 32 angularly integral with arm 4; and a peripheral lip 37 facing bush 17 and laterally surrounding mating wall 31 close to conical surface 34.

Tensioner 1 also comprises a lock device 40 for locking arm 4 in a service angular position to facilitate assembly of the belt to the drive, and which normally corresponds to maximum torsion of torsion bar 6.

Lock device 40 comprises two brackets 41a, 41b projecting radially from housing 2 and defining a slide seat having an axis B parallel to axis A; a pin 43 movable inside the slide seat between an engaged position, engaging slot 36 on arm 4, and a release position; and a helical spring 44 fitted to pin 43 to maintain a stable release position.

More specifically, pin 43 comprises a stop head 45 located on the opposite side of brackets 41a, 41b to arm 4; and a retaining ring 46 housed in an annular groove on pin 43 and located, in use, between the two brackets 41a, 41b. Helical spring 44 is compressed between bracket 41a and retaining ring 46.

Axis B is located on the opposite side of axis A to pulley 5, and at such a radial distance from axis A as to permit a sufficient lever arm of pin 43, and to house friction member 32 radially.

Alternative embodiments of the present invention will now be described, using the same reference numbers for identical or equivalent component parts.

FIG. 4 shows a two-arm tensioner 50, in which arm 4 is connected elastically to a second arm 51, supporting an idle pulley 52, by means of a torsionally rigid sleeve 53 (FIG. 5) comprising an end portion 54 connected rigidly to bush 17.

Figure 7:
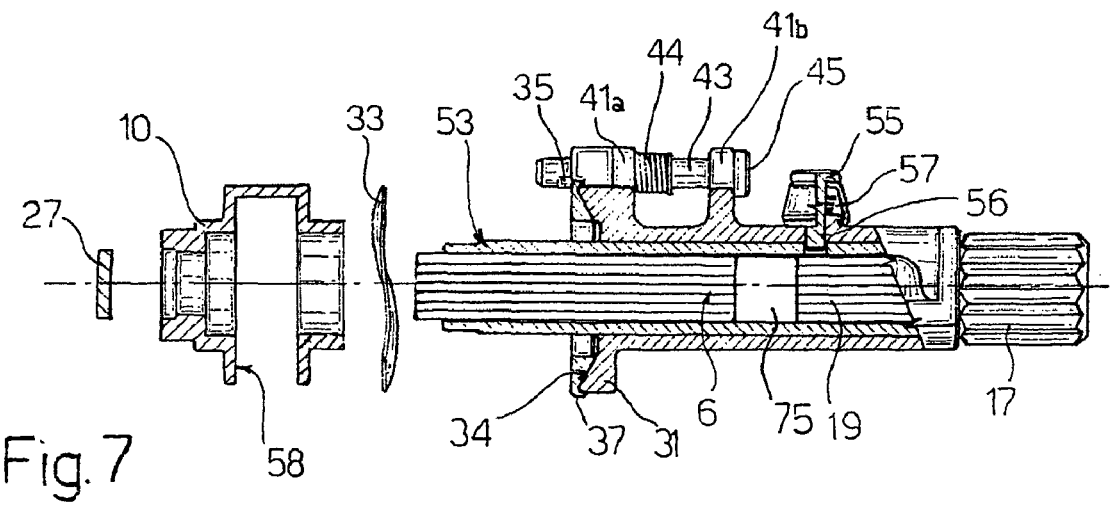
FIG. 7 shows a section of the FIG. 4 tensioner along line VII-VII in FIG. 6.
Figure 9:
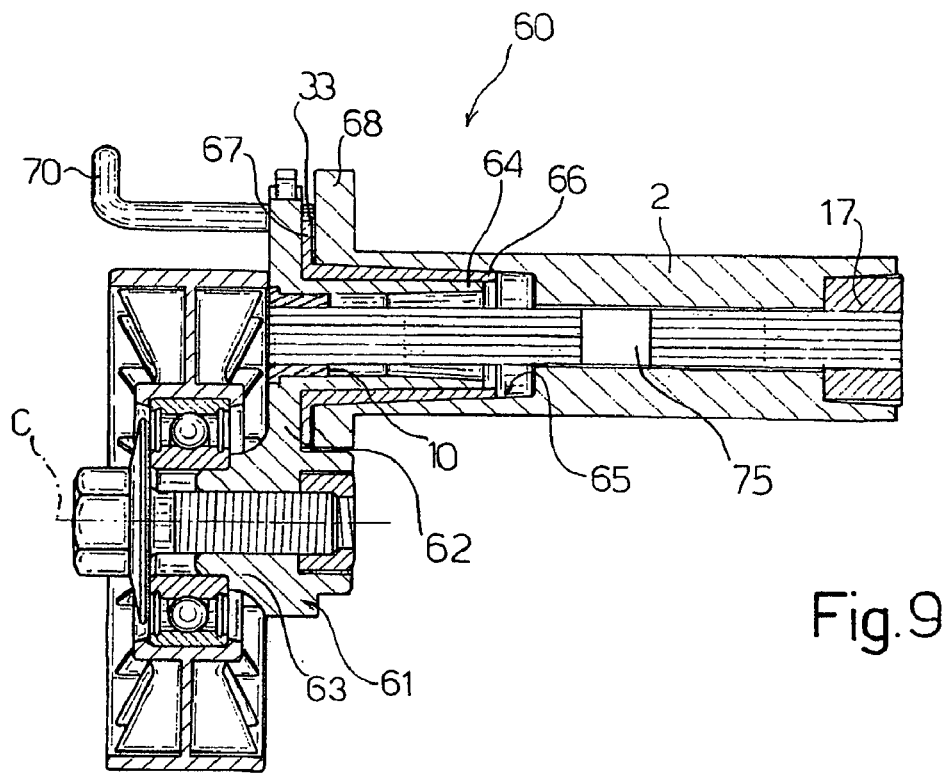
FIG. 9 shows a section of the tensioner along line IX-IX in FIG. 8.

More specifically, the second arm 51 lies in the same plane of symmetry S, and is inserted radially inside a circumferential opening 58 in cap 10 (FIGS. 6 and 7), between the two shells 22 defining arm 4. Sleeve 53, housed for rotation inside cavity 3 of housing 2, integrally defines hub 9 at the opposite end to end portion 54.

Damping device 30 is the same as in tensioner 1 as regards arm 4, whereas relative oscillation between the two arms is damped by two friction bushes 59 interposed between cap 10 and sleeve 53. Lock device 40 comprises pin 43 acting on arm 4; and a second pin 55, which slides inside a radial seat 56 on housing 2 to selectively engage sleeve 53, to make it angularly fixed or rotary, under the control of a spring 57 operating in the same way as helical spring 44.

Figure 8:
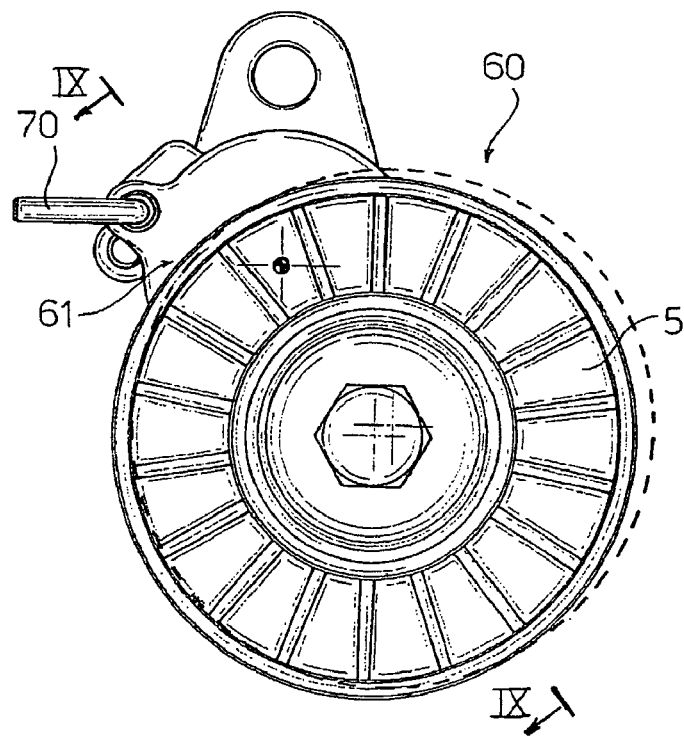
FIG. 8 shows a front view of a further embodiment of the present invention.

FIG. 8 shows a second one-arm tensioner 60 comprising an arm 61 comprising a flat elongated plate 62 and having, at opposite ends, a pin 63, of axis C parallel to axis A, supporting projecting pulley 5; and a hub 64 extending on the axially opposite side to pin 63 and housed inside a conical cavity 65 of housing 2, at the opposite end to bush 17.

Damping device 30 comprises, integrally, a conical friction bush 66 driven onto hub 64, cooperating frictionally with a lateral surface of conical cavity 65, and having an annular end flange 67 interposed between plate 62 and a front flange 68, perpendicular to axis A, of housing 2.

Tensioner 60 comprises a known lock device comprising two holes located at the same radial distance and formed respectively in flat plate 62 and front flange 68; and a removable pin 70 engaging both holes in the service angular position.

Tensioners 1, 50 and 60 operate as follows.

In actual use, pulley 5 converts transverse oscillation of the belt into angular oscillation of arm 4, thus varying the torsion angle of torsion bar 6.

According to known laws of elasticity, the variation in the torsion angle produces both a variation in the elastic torsional reaction of torsion bar 6, depending on the amount of angular oscillation, and a reduction in the length of torsion bar 6, which effect is proportional to the radial distance of beam elements 19 from the axis A of rotation.

The variation in length affects the axial load acting on friction member 32. More specifically, the axial component compressing friction member 32 increases alongside an increase in the torsion angle of torsion bar 6.

To achieve the above effect, the tensioner is assembled by first assembling pulley 5 between the two shells 22, and cap 10 inside seat 21 to form arm 4. Arm 4 is then placed on a fixed assembly fixture, with head 13 facing downwards and locked angularly inside a seat, so that beam elements 19 can be inserted inside cap 10, and housing 2 fitted over beam elements 19, with undulated spring 33 and friction member 32 interposed between arm 4 and mating wall 31.

At this point, housing 2 is secured to the assembly fixture in a rigid calibration position, which serves as both an axial and angular reference with respect to cap 10 to achieve the right axial preload of undulated spring 33 and the right torsional preload of torsion bar 6.

Bush 17, fitted to end portion 16 of torsion bar 6, is rotated inside coaxial seat 18 by a torque wrench inserted inside dead holes 20c, and is driven in when torsion bar 6 reaches a calibration torsion value suitable for both the torsional preload and an initial axial preload.

Finally, arm 4 is set to the service angular position, which corresponds to greater torsion of torsion bar 6 than the calibration angular position, thus adding a further axial load produced by torsion of torsion bar 6.

In the service angular position, movable pins 43, 55 are kept in the engaged position locking arm 4 by friction, produced by torsion bar 6, with the inner surface of slot 36 and with radial seat 56.

To release the tensioner, head 13 of cap 10 is simply gripped with a tool and turned to reduce the friction force on pin 43, so that helical spring 44 overcomes the friction force and automatically releases pin 43 to permit movement of arm 4.

Two-arm tensioner 50 is assembled in the same way, except that bush 17 is driven onto sleeve 53, as opposed to housing 2, in a reference angular position of arm 4 with respect to arm 51, and at a predetermined torsion value of torsion bar 6. Axial preloading of torsion bar 6 is achieved by the combined action of cap 10 and bush 17 on mating wall 31 and, respectively, on a flat end surface of the housing 2 opposite mating wall 31. Moreover, release of pin 43 automatically also releases second pin 55, thus eliminating any tangential force on sleeve 53.

The advantages of the tensioners according to the present invention will be clear from the foregoing description.

By exploiting the variation in length of torsion bar 6 alongside a variation in torsion angle, the size of undulated spring 33 can be reduced, so that the damping device can be fitted to the tensioner itself to form a single module, and can be assembled faster and easier.

The assembly method provides for calibrating not only undulated spring 33 but also the axial preload provided by torsion bar 6, which increases or decreases alongside an increase or decrease respectively in the torque setting of the torque wrench.

Moreover, the fact that the axial component increases with the torsion angle provides for improved damping of higher-amplitude oscillations, thus increasing the effectiveness of damping device 30 in operating conditions requiring greater damping, and enabling a significant reduction in the size of the device.

To reduce size crosswise to axis A of the belt tensioner, in particular, a friction member 32 with a conical surface is used.

Employing an angular lock device 40 comprising a non-removable lock pin 43, the right pin for the job is immediately available at all times.

Automatic spring operation of lock pin 43 also simplifies maintenance by enabling assembly of the belt and operation of arm 4 by simply working on head 13 of cap 10, which is easily accessible, with no need for access to locking device 40.

Using pressed sheet metal shells reduces production cost and provides for easily obtaining a strong, lightweight closed box section of arm 4; and the symmetrical configuration with respect to plane S eliminates any turning moments and provides for easily guiding arm 4.

Clearly, changes may be made to the tensioners as described and illustrated herein without, however, departing from the scope of the present invention as defined in the accompanying Claims.

Conveniently, torsion bar 6 is provided with a metallic collar 75 that surrounds and circumferentially tightens a central portion of torsion bar 6 in order to avoid the relative detachment of beam elements 19 under torsional load.

The invention claimed is:

1. A tensioner for a vehicle belt drive, comprising:
an elongated housing defining a longitudinal cavity having an axis, wherein the elongated housing forms a cylindrical hub at a first end thereof;
at least one arm fitted to said housing to rotate about said axis, wherein said at least one arm comprises a rigidly connected cap fitted to the hub, and wherein the cap is coupled to the hub through a bush to guide the rotation of the arm with respect to said axis and give radial support to the arm;
an idle pulley fitted to said at least one arm and cooperating with a belt of said belt drive;
a torsion bar elastic member housed at least partly in said cavity and having a first end portion rigidly connected to said cap, and a second end portion opposite the first and connected rigidly to a retaining portion rigidly connected to a second end portion of said housing to permit tensioning of said elastic member; and
a damping device for damping oscillation of said at least one arm, and comprising a conical friction member cooperating axially and frictionally with a mating surface defined by the housing by virtue of rotation of said at least one arm, and loaded by axial elastic means, wherein said friction member is interposed between said at least one arm and said housing, and wherein said elastic member includes a number of beam elements having a polygonal cross section and having said first and said second end portion engaging shaped cavities carved on said cap and said retaining portion respectively to define a rigid connection with said cap and said retaining portion.

2. The tensioner as claimed in claim 1, wherein said damping device comprises a mating wall integral with said housing and defining said mating surface cooperating with said friction member; and in that said friction member is carried by said at least one arm.

3. The tensioner as claimed in claim 1, wherein said cross section of said beam elements is hexagonal.

4. The tensioner as claimed in claim 1, wherein said retaining portion comprises a regular succession of radial portions projecting inside said shaped cavity and arranged symmetrically with respect to said axis.

5. The tensioner as claimed in claim 1, further comprising a lock device for locking said at least one arm angularly with respect to said housing, and in turn comprising at least one movable member slidable between a first lock position engaging a seat on said at least one arm or said housing, and a second lock position releasing said seat; said lock device comprising elastic means for keeping said movable member in said second lock position.

6. The tensioner as claimed in claim 5, wherein said movable member is kept in said first lock position by friction generated on said movable member by said elastic member.

7. The tensioner as claimed in claim 1, wherein said at least one arm has a closed box section.

8. The tensioner as claimed in claim 7, wherein said at least one arm comprises a first and a second shell made of pressed sheet metal and connected rigidly along a joining plane.

9. The tensioner as claimed in claim 8, wherein said shells comprise, integrally, cylindrical end projections defining a pin for supporting said pulley.

10. The tensioner as claimed in claim 8, wherein said plane is a plane of symmetry.

11. The tensioner as claimed in claim 1, wherein said cap comprises a head engageable by a tool.

12. The tensioner as claimed in claim 1, wherein said retaining portion and said hub are connected rigidly to opposite ends of said housing.

13. The tensioner as claimed in claim 12, wherein said retaining portion is driven inside said housing.

14. The tensioner as claimed in claim 1, further comprising a second arm supporting a second idle pulley substantially coplanar with said pulley; and wherein the tensioner is connected rigidly to said retaining portion by a torsionally rigid sleeve mounted to rotate with respect to said housing inside said cavity.

15. The tensioner as claimed in claim 14, wherein said lock device comprises a second movable member fitted in sliding manner to said housing, and which can be set selectively to an engaged position engaging said sleeve to lock said sleeve angularly, and a release position releasing said sleeve to permit rotation of said sleeve.

16. The tensioner as claimed in claim 1, further comprising a collar that surrounds a central portion of said elastic member and circumferentially tightens said beam elements between each other.

17. A method of assembling a tensioner including an elongated housing defining a longitudinal cavity having an axis, wherein the elongated housing forms a cylindrical hub at a first end thereof, at least one arm fitted to said housing to rotate about said axis, wherein said at least one arm comprises a rigidly connected cap fitted to the hub, and wherein the cap is coupled to the hub through a bush to guide the rotation of the arm with respect to said axis and give radial support to the arm, an idle pulley fitted to said at least one arm and cooperating with a belt of said belt drive, a torsion bar elastic member housed at least partly in said cavity and having a first end portion rigidly connected to said cap, and a second end portion opposite the first and connected rigidly to a retaining portion rigidly connected to a second end portion of said housing to permit tensioning of said elastic member; and a damping device for damping oscillation of said at least one arm, and comprising a conical friction member cooperating axially and frictionally with a mating surface defined by the housing by virtue of rotation of said at least one arm, and loaded by axial elastic means, wherein said friction member is interposed between said at least one arm and said housing, wherein said elastic member includes a number of beam elements having a polygonal cross section and having said first and said second end portion engaging shaped cavities carved on said cap and said retaining portion respectively to define a rigid connection with said cap and said retaining portion, wherein said retaining portion and said hub are connected rigidly to opposite ends of said housing, and wherein said retaining portion is driven inside said housing the method comprising:

fitting said first end portion to said cap connected to said at least one arm;

assembling said housing over said elastic member;

locking said at least one arm and said housing in a relative calibration position;

fitting said retaining portion to said second end portion of said elastic member;

twisting said elastic member to a calibration value using said retaining portion; and driving said retaining portion onto said housing.

18. The method as claimed in claim 17, further comprising the step of setting said at least one arm and said housing to a service angular position corresponding to greater torsion of said elastic member than in said relative calibration position, and activating said lock device.

19. A method of assembling a tensioner for a vehicle belt drive, comprising:

an elongated housing defining a longitudinal cavity having an axis, wherein the elongated housing forms a cylindrical hub at a first end thereof;

at least one arm fitted to said housing to rotate about said axis, wherein said at least one arm comprises a rigidly connected cap fitted to the hub, and wherein the cap is coupled to the hub through a bush to guide the rotation of the arm with respect to said axis and give radial support to the arm;

an idle pulley fitted to said at least one arm and cooperating with a belt of said belt drive;

a torsion bar elastic member housed at least partly in said cavity and having a first end portion rigidly connected to said cap, and a second end portion opposite the first and connected rigidly connected to a second end portion of said housing to permit tensioning of said elastic member;

a damping device damping device of said least one arm, and comprising a conical friction member cooperating axially and frictionally with a mating surface defined by the housing by virtue of rotation of said at least one arm, and loaded loaded by axial elastic means, wherein said friction member is interposed between said at least one arm and said housing, and wherein said elastic member includes a number of beam elements having a polygonal cross section and having said first and said second end portion engaging shaped cavities carved on said cap and said retaining portion respectively to define a rigid connection with said cap and said retaining portion, a second arm supporting a second idle pulley substantially coplanar with said pulley; and wherein the tensioner is connected rigidly to said retaining portion by a torsionally rigid sleeve mounted to rotate with respect to said housing inside said cavity, the method comprising the steps of:

fitting the first end portion to said cap of said at least one arm;

inserting said sleeve inside said cap and connecting said second arm rigidly to said sleeve;

fitting said sleeve inside said cavity, and inserting said elastic member inside said sleeve;

locking said at least one arm and said second arm in a relative calibration position;

fitting said retaining portion to said second end portion of said elastic member;

twisting said elastic member to a calibration value using said retaining portion; and driving said retaining portion onto said sleeve.

* * * * *